(12) United States Patent
Fay

(10) Patent No.: US 11,960,358 B1
(45) Date of Patent: Apr. 16, 2024

(54) MORE SECURE DATA READING WITH ERROR CORRECTION CODES

(71) Applicant: NXP B.V., Eindhoven (NL)

(72) Inventor: Björn Fay, Brande-Hörnerkirchen (DE)

(73) Assignee: NXP B.V., Eindhoven (NL)

( * ) Notice: Subject to any disclaimer, the term of this patent is extended or adjusted under 35 U.S.C. 154(b) by 76 days.

(21) Appl. No.: 17/937,138

(22) Filed: Sep. 30, 2022

(51) Int. Cl.
G06F 11/00 (2006.01)
G06F 11/10 (2006.01)
G06F 21/56 (2013.01)

(52) U.S. Cl.
CPC ........ *G06F 11/1044* (2013.01); *G06F 21/566* (2013.01); *G06F 2221/034* (2013.01)

(58) Field of Classification Search
CPC ...... G06F 11/08; G06F 11/10; G06F 11/1012; G06F 11/1016; G06F 11/1044; G06F 11/1048; G06F 21/64; G06F 21/78; G06F 21/79; G06F 12/14
See application file for complete search history.

(56) References Cited

U.S. PATENT DOCUMENTS

| | | | |
|---|---|---|---|
| 8,375,253 B2 * | 2/2013 | Benoit | G06F 21/755 714/48 |
| 8,583,880 B2 | 11/2013 | Wagner | |
| 8,793,558 B2 | 7/2014 | Cunningham | |
| 8,850,292 B2 | 9/2014 | Lee | |
| 9,081,708 B2 | 7/2015 | Mu | |
| 9,606,864 B2 | 3/2017 | Lee | |
| 9,773,565 B1 | 9/2017 | Yeh | |
| 10,623,025 B2 | 4/2020 | Lee | |
| 11,694,761 B2 | 7/2023 | Ostertun et al. | |
| 2011/0072222 A1 * | 3/2011 | Wagner | G06F 21/556 711/155 |
| 2016/0239365 A1 * | 8/2016 | Schweer | G06F 21/77 |
| 2017/0346504 A1 * | 11/2017 | Johar | G06F 11/1016 |
| 2018/0136864 A1 * | 5/2018 | Wang | G06F 3/0653 |
| 2020/0193040 A1 * | 6/2020 | Williams | G06F 11/1048 |

* cited by examiner

*Primary Examiner* — Marc Duncan

(57) ABSTRACT

Various embodiments relate to a memory controller configured to read data from a memory array, including: an error correction codes (ECC) encoder configured to encode data stored in the memory array; an ECC decoder configured to decode first data read from the memory array based upon a first read request and detect errors in the first data read from the memory array; and a fault controller configured to: command the memory controller to read other data from the memory array when the ECC detects an error; command the memory controller to re-read the first data from the memory array; when the ECC detects an error; compare the re-read first data to the read first data; and signal a fault attack when the re-read first data is different from the read first data.

24 Claims, 2 Drawing Sheets

MORE SECURE DATA READING WITH ERROR CORRECTION CODES

TECHNICAL FIELD

Various exemplary embodiments disclosed herein relate generally to a more secure and efficient method for reading data from a memory using error correction codes (ECC).

BACKGROUND

For modern IT systems especially secure and/or embedded systems, fault attacks (FA) are a growing concern, and the attacks continue to get better, easier, and cheaper. One major attack path is a fault in the data/code read path especially for localized attacks, like laser fault injection (LFI) or electromagnetic fault injection (EMFI) that may be directly applied to the memory.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a memory controller configured to read data from a memory array, including: an error correction code (ECC) encoder configured to encode data stored in the memory array; an ECC decoder configured to decode first data read from the memory array based upon a first read request and detect errors in the first data read from the memory array; and a fault controller configured to: command the memory controller to read other data from the memory array when the ECC detects an error; command the memory controller to re-read the first data from the memory array; when the ECC detects an error; compare the re-read first data to the read first data; and signal a fault attack when the re-read first data is different from the read first data.

Various embodiments are described, wherein the memory controller returns the first data read from the memory array when the ECC decoder detects no error in the first data read from the memory array.

Various embodiments are described, wherein the detected error is a correctable error.

Various embodiments are described, wherein the fault controller is further configured to signal a fault attack when the ECC decider detects an uncorrectable error.

Various embodiments are described, wherein the memory controller returns the first data read from the memory array when the re-read first data is the same as the read first data.

Various embodiments are described, wherein reading other data includes reading second data from the memory array based upon a second read request.

Various embodiments are described, wherein reading other data includes reading third data from the memory array based upon a third read request.

Various embodiments are described, wherein reading other data includes reading a reference value from the memory array.

Various embodiments are described, wherein the reference value is used to detect a fault attack.

Various embodiments are described, wherein reading other data includes reading one of a plurality of reference values from the memory array, wherein the one reference value is in a location associated with a memory address of the first read request.

Various embodiments are described, wherein reading other data includes reading a first reference value and a second reference value from the memory array.

Various embodiments are described, wherein the first reference value has all 0 bits and the second reference value has all 1 bits.

Various embodiments are described, wherein reading other data includes reading second data from the memory array based upon a second read request and a reference value from the memory array.

Various embodiments are described, wherein the ECC encoder is further configured to encode a memory address of the encoded data stored in the memory array, the ECC decoder is further configured to decode encoded memory address from the memory array based upon the first read request and detect errors in the memory address, and the error includes an error in the memory address.

Further various embodiments relate to a memory controller configured to read data from a memory array, including: an error correction code (ECC) encoder configured to encode data stored in the memory array; an ECC decoder configured to decode first data read from the memory array based upon a first read request and detect errors in the first data read from the memory array; and a fault controller configured to: command the memory controller to read other data from the memory array when the ECC decoder detects a correctable error; command the memory controller to re-read the first data from the memory array; when the ECC decoder detects a correctable error; compare the re-read first data to the read first data; signal a fault attack when the re-read first data is different from the read first data; and signal a fault attack when the ECC decoder detects an uncorrectable error, wherein the memory controller returns the first data read from the memory array when the re-read first data is the same as the read first data, and wherein the memory controller returns the first data read from the memory array when the ECC decoder detects no error in the first data read from the memory array.

Various embodiments are described, wherein reading other data includes reading second data from the memory array based upon a second read request.

Various embodiments are described, wherein reading other data includes reading third data from the memory array based upon a third read request.

Various embodiments are described, wherein reading other data includes reading a reference value from the memory array.

Various embodiments are described, wherein the reference value is used to detect a fault attack.

Various embodiments are described, wherein reading other data includes reading one of a plurality of reference values from the memory array, wherein the one reference value is in a location associated with a memory address of the first read request.

Various embodiments are described, wherein reading other data includes reading a first reference value and a second reference value from the memory array.

Various embodiments are described, wherein the first reference value has all 0 bits and the second reference value has all 1 bits.

Various embodiments are described, wherein reading other data includes reading second data from the memory array based upon a second read request and a reference value from the memory array.

Various embodiments are described, wherein the ECC encoder is further configured to encode a memory address of the encoded data stored in the memory array, the ECC decoder is further configured to decode encoded memory address from the memory array based upon the first read request and detect errors in the memory address, and the correctable error includes a correctable error in the memory address.

BRIEF DESCRIPTION OF THE DRAWINGS

In order to better understand various exemplary embodiments, reference is made to the accompanying drawings.

To facilitate understanding, identical reference numerals have been used to designate elements having substantially the same or similar structure and/or substantially the same or similar function.

DETAILED DESCRIPTION

Figure 1:
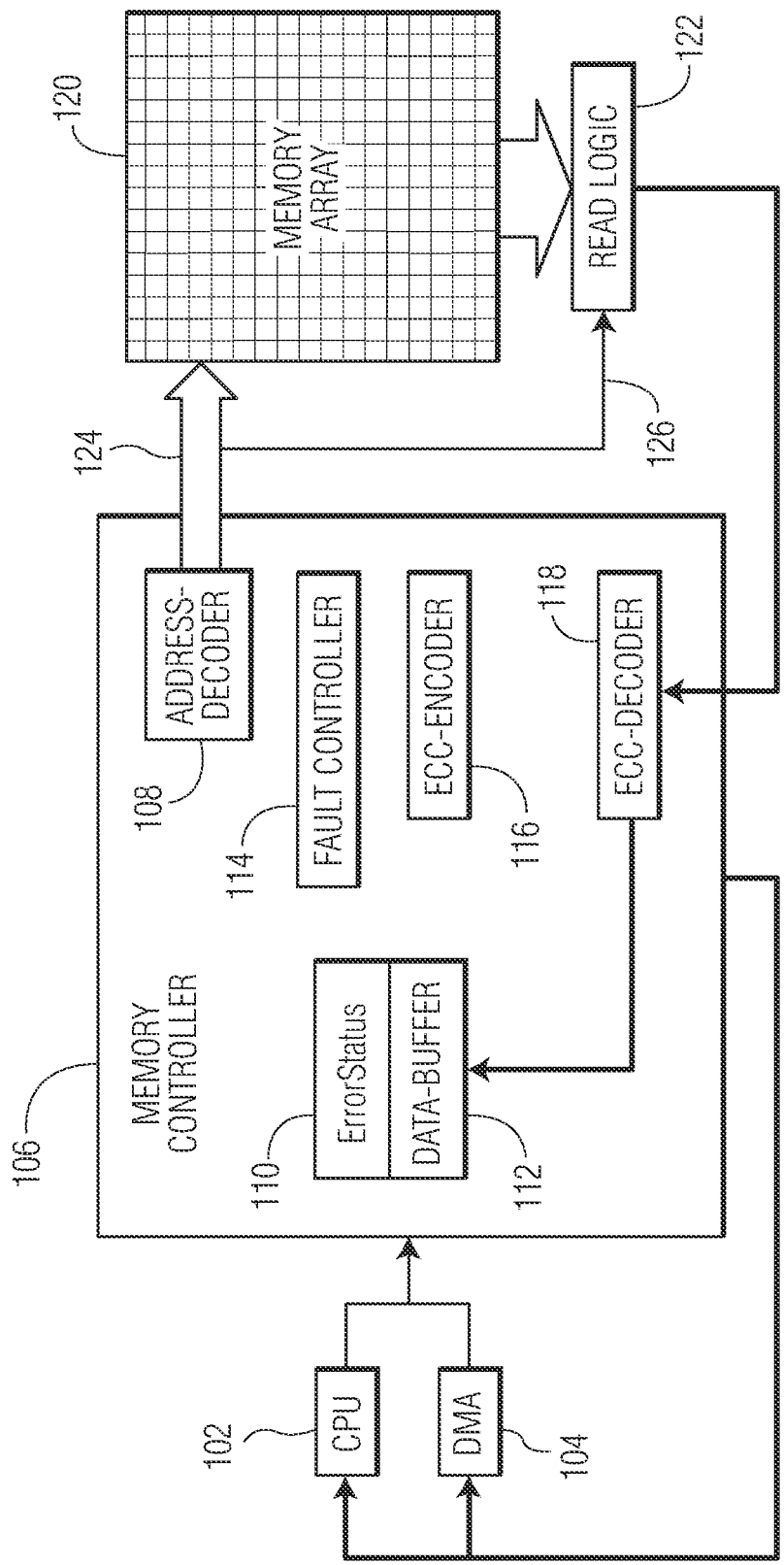
FIG. 1 illustrates a memory system that includes a fault controller.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

For modern IT systems especially secure and/or embedded systems, fault attacks (FA) are a growing concern, and the attacks continue to get better, easier, and cheaper. One major attack path is a fault in the data/code read path including the memory address like laser fault injection (LFI) or electromagnetic fault injection (EMFI) that may be directly applied to the memory. To prevent such attacks, several methods have been developed, such as for example, adding an error detection code (EDC) to the memory or reading the data twice and in some cases reading the data twice with some other data read in between to also detect long pulse attacks that would otherwise also have faulted the re-read in the same way. Both of those methods have drawbacks. Namely, an EDC would need extra bits in the memory and the re-read obviously has some performance penalty.

Most memories already have some error correction code (ECC) added to the data bits, but which usually only has some very limited error detection capability. Usually, ECC schemes have quite some area overhead in the memory as extra ECC bits need to be stored, but the ECC schemes do not provide much error detection, so error detection would usually cost additional area. Embodiments of a memory controller and method will be disclosed herein that re-uses those already available extra bits also for error detection. That is when the ECC scheme detects a correctable error (uncorrectable errors directly lead to a fault detection), the data will be re-read again. To defend against long pulse attacks some other data will be read in between the original data read and the re-read of the data. There are several options for the intermediate data, which depends on the actual system and type of memory, e.g., the next data request is carried out and/or some reference data is read. Because errors do not only occur in the data, but also may occur in the address, (for example by attacking the address decoder) the address might also be included into the ECC scheme but only for error detection (i.e., there is no error correction of the address information) by using the remaining code space in the ECC.

FIG. 1 illustrates a memory system that includes a fault controller. In a computer system there will be some data requestor, e.g. the central processing unit (CPU) or direct memory access (DMA), that wants to read data from some address in memory. To read data from the memory, a memory controller 106 receives the data memory address, and an address decoder 108 decodes the memory address to a row select signal 124 and also to a word selection signal 126. Then the data stored in the memory array 120 is output over the bit lines by the read logic 122. Depending on the memory-cell technology used in the memory array 120, the memory cells might be more or less reliable, such that some mechanism may be added to handle errors. The usual solution is to add some error correction code (ECC) to the data word. An ECC encoder 116 may be used to create a correction code stored with the data in the memory array 120. An ECC decoder 118 may be used to decode the written ECC data and to process the data read from the memory array 120 and check it. The ECC decoder 118 may indicate if there is an error and if so if the error is correctable. Further, the ECC decoder 118 may be able to correct for one, two, or more errors depending upon the ECC chosen. Commonly used sizes for (payload) data and ECC are for example 32+6, 64+7, 128+8, 256+9, or 512+10. There are also codes that can correct more than one error, but in general the ECC decoder 118 distinguishes between correctable and uncorrectable errors, which the ECC decoder 118 signals to a fault controller 114. If a detected error is a correctable error, the ECC decoder 118 corrects it, and the corrected data is returned to the requester in the system using the data buffer 112. Any error indications may be stored in the error status 110.

The memory controller 106 may also include fault controller 114 that controls fault detection in the memory controller 106. The fault controller 114 carries out the fault detection method that will now be described.

Figure 2:
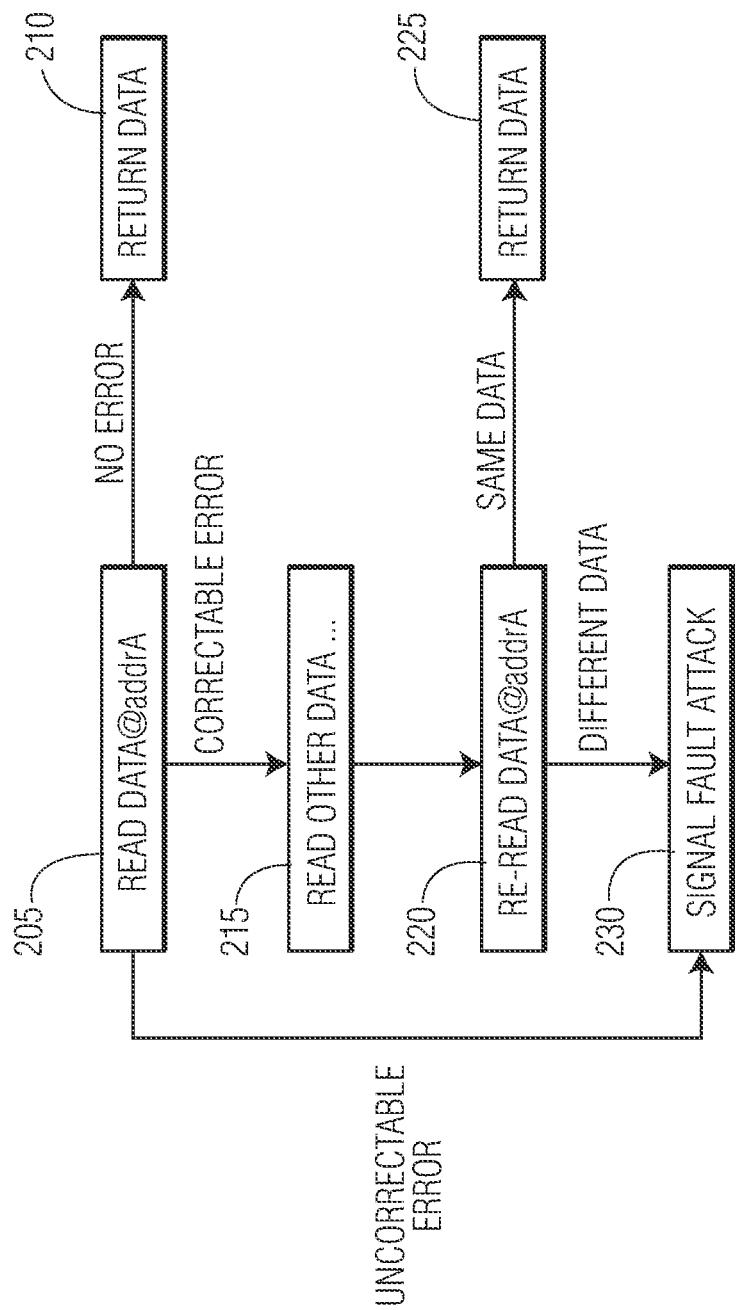
FIG. 2 illustrates a flow diagram of the operation of the fault controller.

FIG. 2 illustrates a flow diagram of the operation of the fault controller 114. The memory controller 106 first reads data at an address A 205, and the ECC decoder 118 decodes the read data. If there is no error in the data, the fault controller 114 has the memory controller 106 return the data 210. If there is an uncorrectable error, the fault controller 114 indicates a signal fault attack 230. If the data includes a correctable error, then the memory controller 106 reads other data 215. In another embodiment, the memory control 106 may read other data 215 for any type of error detected by the ECC decoder 118. The other data that is read may be the next data read in the queue or any number of next data reads, reference data or a number of different reference data, or some mix of next data reads and reference data. This will be further explained below. Next, the fault controller 114 has the memory controller 106 re-read the data at address A 220.

If the same data is read, then the read data is returned 225. If different data is read, then fault controller 114 indicates a signal fault attack 230.

Please note that the data may be compared before or after the error correction. Both are possible (or even a mix, i.e., doing both), but comparing after correction is the more robust option. If you compare before correction, you also have to take into account possible normal temporary errors that may occur in reading the data.

For the step read other data 215, there are several options. These options may be illustrated by the following reading sequences. If there is a correctable error in a word, the underlined reads occur. If there is no error in a word, the underlined reads are skipped. In the following list "ref" means reading a reference value which is capable of detecting errors. That can either be from a specific address or even some extra hardwired special logic which is sensitive to fault attacks. Further "ref0" and "ref1" means reading all 0 and all 1 bit data, respectively, from a specific address or using some extra logic. These reference values help to detect faults that only toggle bits in one direction. Of course those reference values could also contain "normal" errors, which needs to be taken into account for the comparison. The single letters indicate different addresses. Some possible options (not a complete list) are:

1. A, ref, A, B, ref, B, . . .
2. A, ref0, ref1, A, B, ref0, ref1, B, . . .
3. A, B, A, B, C, D, C, D, . . .
4. A, B, A, C, B, D, C, E, D, . . .
5. A, B, ref, A, C, B, D, ref, C, E, D, F, ref, E, G, F, . . .

The first two options 1 and 2 read some reference value(s) between the two data reads of an address. In option 1, a single reference value may be read before a re-read of the value showing a correctable error. In option 2, two references are read: the all 0 and the all 1. In some embodiments, bit flips in the reference values may be detected and used to confirm the location of errors and the correction of errors. The reference reads should detect long pulses applied to the memory and the re-read should detect short pulses. Note that those reference reads might need to be physically close to the address A (or the specific address being used) to actually be able to detect a fault attack on address A. So one might need to have multiple such reference values spread throughout the memory array 120 to increase the chance of detecting fault attacks, depending on the design, technology, and layout. So each memory address may have an associated reference value(s) that are used to detect faults when the memory address is read. Option 3 interleaves the data reads with the following data read(s), but note that here a long pulse might apply the same errors on all four such reads and hence may not be detected. Option 4 solves this problem by chaining all reads together, such that a long pulse (i.e., a pulse shorter than the time it takes to do two reads) will always leave at least one of the reads in the read pair outside the pulse, such that one read is under the pulse and the other read is outside the pulse. But also very long pulses might just cover the complete read of all the data and/or if the data is not coming from the same location those interleaved readings might not be influenced by the fault, such that you could again have all pairs either with faults or without faults, and hence the faults are undetected. Option 5 solves this again by inserting reference reads between each pair, which is kind of similar to option 1, but more efficient if all data needs to be re-read. But as can be seen this option is also the most complex one and will lead to a more complex implementation. Also, care must be taken so that the reference read is close enough to all surrounding pairs, such that the reference read may be used to actually detect fault attacks in those situations. Otherwise, more reference reads may be inserted. Please note that under normal conditions errors occur very rarely, such that under normal conditions performance-wise there is practically no difference between option 1 and 5.

In case of reading reference data, one could also try to correct a fault by using the difference from the expected reference value as a correction value and feed this through the normal error correction/detection mechanism to see if the error can be corrected.

To increase the fault detection capability, the memory addresses may be added to the ECC, such that faults in the address decoder would also trigger a re-read and hence lead to the chance to be detected, especially if the ref values are from different addresses, which would then also be wrong and clearly indicate a fault. One approach would be for a Hamming code (but would also work for other codes) to just add the address bits on top of the data bits for the parity and syndrome computation. If the decoder then sees an error in non-data bits, it is still a non-correctable error that comes from the address bits. On the other hand, errors in the addresses might then also lead to mis-corrections in the data (but which is anyhow from the wrong address). To avoid such behavior, an extended Hamming code may be used (by using one extra parity bit), such that all single data errors generate an odd parity and address errors generate an even parity. By this, address errors can never generate a mis-correction and will always be detected as uncorrectable (if detected at all). Similar or even more complex encodings are also possible, but depend on the code and its requirements, e.g., should the all 0 and/or all 1 word be a valid or invalid code word . . .

The fault controller 114 may be implemented as a dedicated hardware circuit. Such hardware circuit may be configurable based upon certain configuration parameters. The fault controller 114 may also be implemented as a processor that is programmed to carry out fault detection method.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A memory controller configured to read data from a memory array, comprising:
   an error correction code (ECC) encoder configured to encode data stored in the memory array;
   an ECC decoder configured to decode first data read from the memory array based upon a first read request and detect errors in the first data read from the memory array; and
   a fault controller configured to:
      command the memory controller to read other data from the memory array when the ECC detects an error;
      command the memory controller to re-read the first data from the memory array;
   when the ECC detects an error;
      compare the re-read first data to the read first data; and
      signal a fault attack when the re-read first data is different from the read first data.

2. The memory controller of claim 1, wherein the memory controller returns the first data read from the memory array when the ECC decoder detects no error in the first data read from the memory array.

3. The memory controller of claim 1, wherein the detected error is a correctable error.

4. The memory controller of claim 3, wherein the fault controller is further configured to signal a fault attack when the ECC decider detects an uncorrectable error.

5. The memory controller of claim 1, wherein the memory controller returns the first data read from the memory array when the re-read first data is the same as the read first data.

6. The memory controller of claim 1, wherein reading other data includes reading second data from the memory array based upon a second read request.

7. The memory controller of claim 6, wherein reading other data includes reading third data from the memory array based upon a third read request.

8. The memory controller of claim 1, wherein reading other data includes reading a reference value from the memory array.

9. The memory controller of claim 8, wherein the reference value is used to detect a fault attack.

10. The memory controller of claim 1, wherein reading other data includes reading one of a plurality of reference values from the memory array, wherein the one reference value is in a location associated with a memory address of the first read request.

11. The memory controller of claim 1, wherein reading other data includes reading a first reference value and a second reference value from the memory array.

12. The memory controller of claim 10, wherein the first reference value has all 0 bits and the second reference value has all 1 bits.

13. The memory controller of claim 1, wherein reading other data includes reading second data from the memory array based upon a second read request and a reference value from the memory array.

14. The memory controller of claim 1, wherein
   the ECC encoder is further configured to encode a memory address of the encoded data stored in the memory array,
   the ECC decoder is further configured to decode encoded memory address from the memory array based upon the first read request and detect errors in the memory address, and
   the error includes an error in the memory address.

15. A memory controller configured to read data from a memory array, comprising:
   an error correction code (ECC) encoder configured to encode data stored in the memory array;
   an ECC decoder configured to decode first data read from the memory array based upon a first read request and detect errors in the first data read from the memory array; and
   a fault controller configured to:
      command the memory controller to read other data from the memory array when the ECC decoder detects a correctable error;
      command the memory controller to re-read the first data from the memory array;
   when the ECC decoder detects a correctable error;
      compare the re-read first data to the read first data;
      signal a fault attack when the re-read first data is different from the read first data; and
      signal a fault attack when the ECC decoder detects an uncorrectable error
   wherein the memory controller returns the first data read from the memory array when the re-read first data is the same as the read first data, and
   wherein the memory controller returns the first data read from the memory array when the ECC decoder detects no error in the first data read from the memory array.

16. The memory controller of claim 15, wherein reading other data includes reading second data from the memory array based upon a second read request.

17. The memory controller of claim 16, wherein reading other data includes reading third data from the memory array based upon a third read request.

18. The memory controller of claim 17, wherein reading other data includes reading a reference value from the memory array.

19. The memory controller of claim 18, wherein the reference value is used to detect a fault attack.

20. The memory controller of claim 15, wherein reading other data includes reading one of a plurality of reference values from the memory array, wherein the one reference value is in a location associated with a memory address of the first read request.

21. The memory controller of claim 15, wherein reading other data includes reading a first reference value and a second reference value from the memory array.

22. The memory controller of claim 21, wherein the first reference value has all 0 bits and the second reference value has all 1 bits.

23. The memory controller of claim 15, wherein reading other data includes reading second data from the memory array based upon a second read request and a reference value from the memory array.

24. The memory controller of claim 15, wherein
the ECC encoder is further configured to encode a memory address of the encoded data stored in the memory array,
the ECC decoder is further configured to decode encoded memory address from the memory array based upon the first read request and detect errors in the memory address, and
the correctable error includes a correctable error in the memory address.

\* \* \* \* \*